Dec. 20, 1932.                 G. W. BINNS                 1,891,661
                                GRINDING
                           Filed May 9, 1925              3 Sheets-Sheet 1
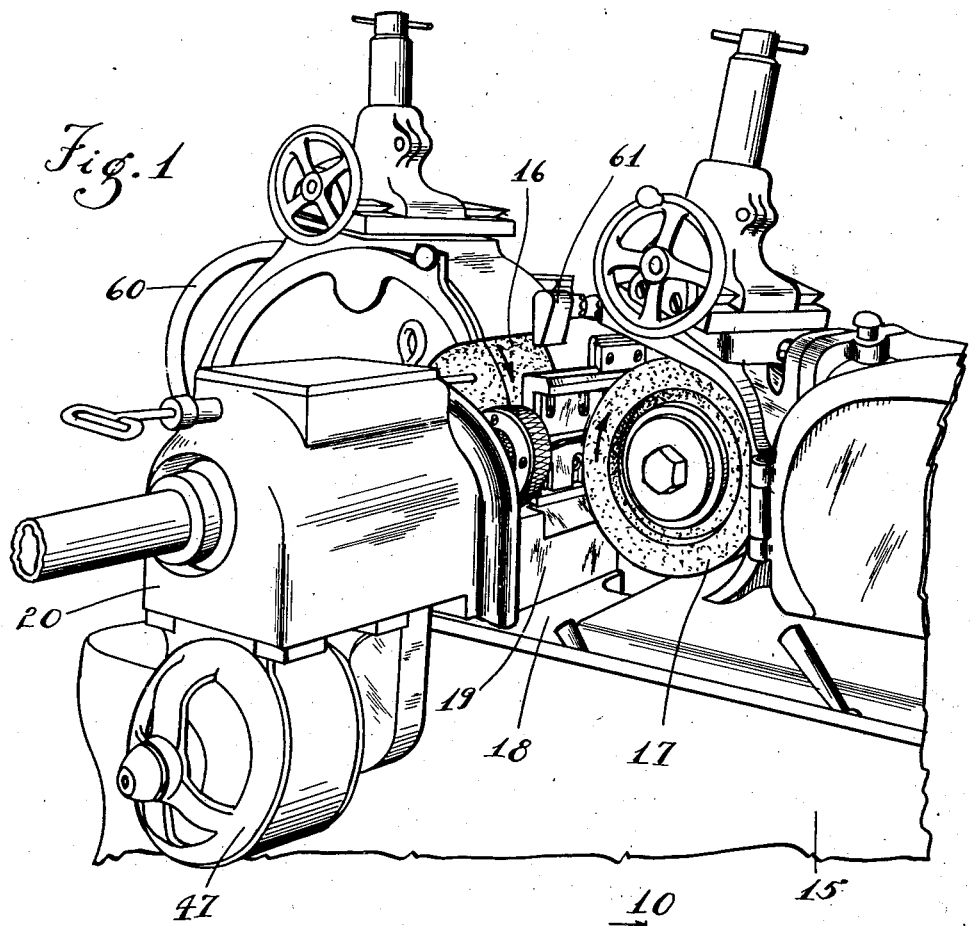
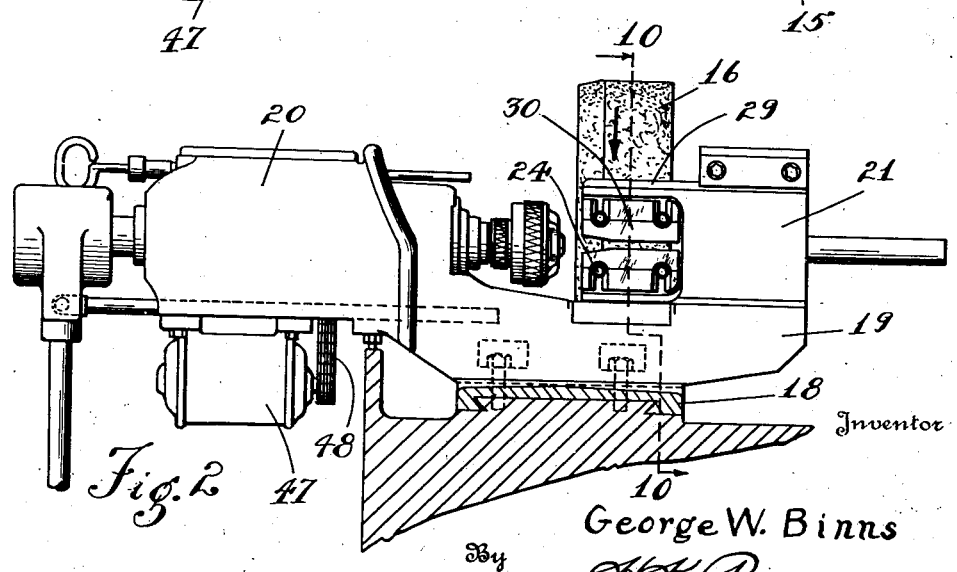
Inventor
George W. Binns
By H. K. Parsons
Attorney

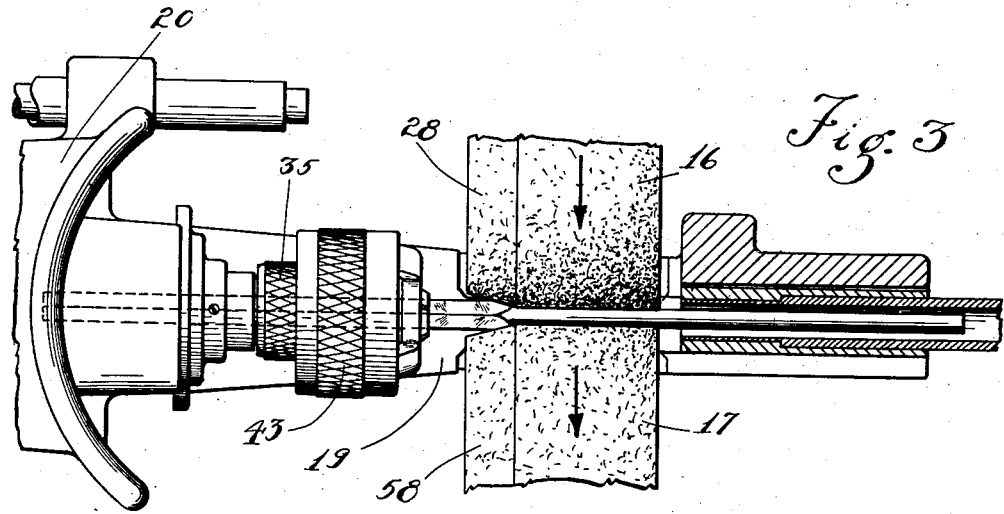
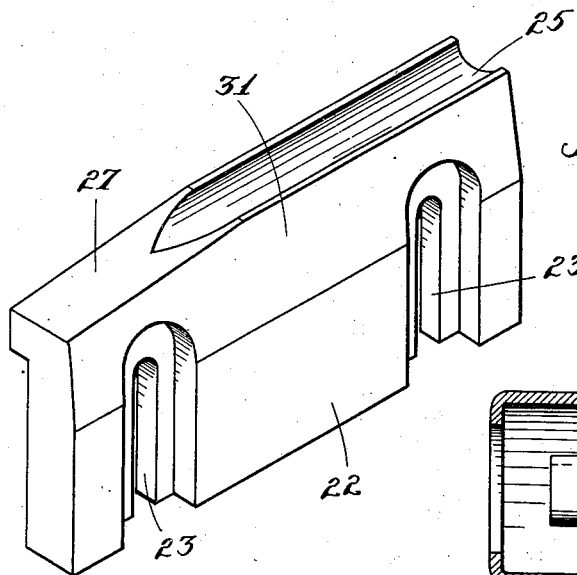
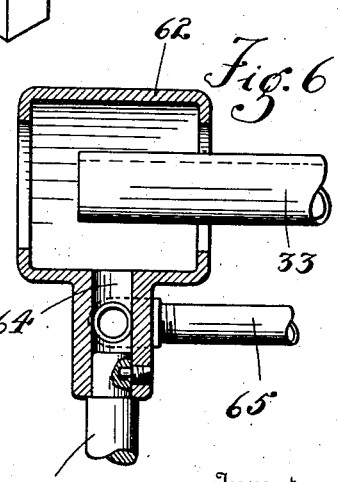
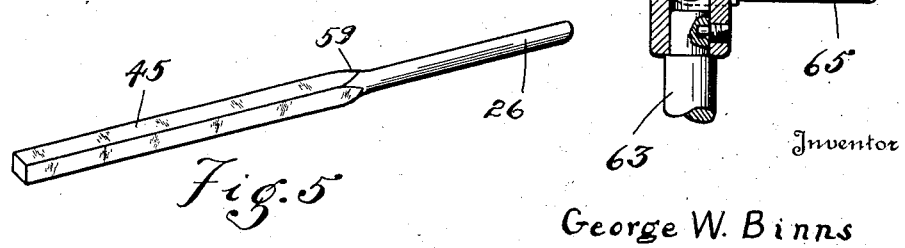
Inventor
George W. Binns
By A. K. Parsons
Attorney

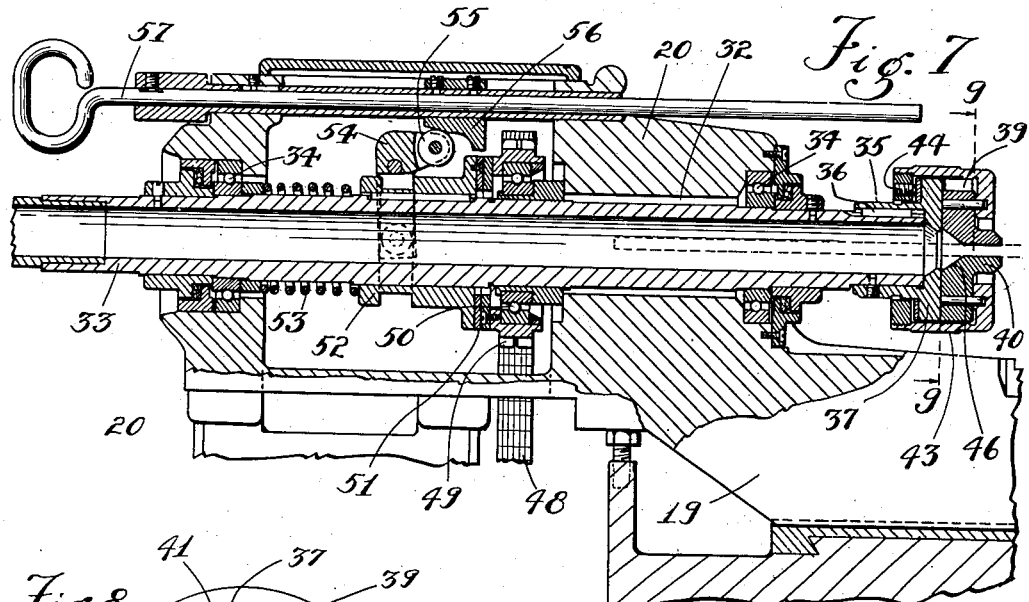
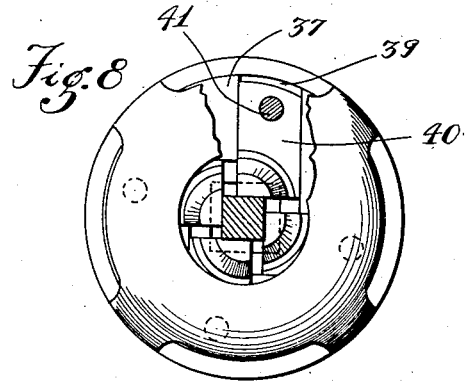
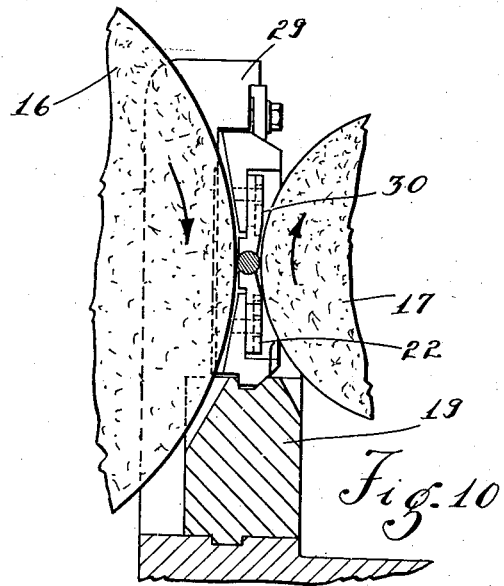
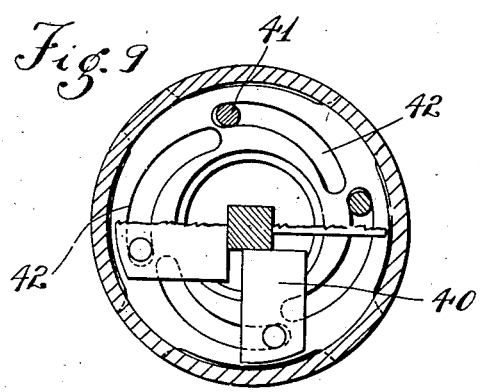
Inventor
George W. Binns
By A. R. Parsons
Attorney Patented Dec. 20, 1932

1,891,661

UNITED STATES PATENT OFFICE

GEORGE W. BINNS, OF CINCINNATI, OHIO, ASSIGNOR, BY MESNE ASSIGNMENTS, TO CINCINNATI GRINDERS INCORPORATED, OF CINCINNATI, OHIO, A CORPORATION OF OHIO

GRINDING

Application filed May 9, 1925. Serial No. 29,213.

This invention relates to improvements in grinding and more particularly to an improved process for producing work of circular form from stock which is initially of rectangular or other non-circular form in cross-section.

Prior to the present invention considerable difficulty has been experienced in endeavoring to produce cylindrical rods of fibre or other materials which can be primarily formed to best advantage in sheet form and subsequently cut or split into bars which are initially of an angular or non-circular form in cross-section.

The primary object of the present invention, therefore, is the provision of a novel and improved device for use in the formation of such rods which will both facilitate the shaping thereof and also produce an accurate and uniform product.

Other objects and advantages of the present invention should be readily apparent by reference to the following specification taken in connection with the accompanying drawings forming a part thereof, and it will be understood that many modifications in the specific structure may be made within the scope of the present claims without departing from or exceeding the spirit of the invention.

Broadly considered, the invention comprises a machine capable of operation on square or other material from which a large amount of stock is to be initially removed and a final finished article of circular cross section produced.

In a more specific aspect the process consists in longitudinally feeding strips of the character above set forth into a gradually contracting throat between cutting and positioning devices and imparting both rotative and longitudinal movements to the work to insure uniform engagement of all portions thereof by the cutting member or members.

In the drawings in which is illustrated one mechanism for carrying out the steps of the process aforesaid.

Figure 1 is a perspective view of such a machine.

Figure 2 is a fragmentary sectional view with the work supporting device shown in elevation.

Figure 3 is a plan view of the work throat and associated parts.

Figure 4 is a perspective view of the work support or rest.

Figure 5 is a perspective view of a partly completed work piece.

Figure 6 is a section of the drain for the work guiding sleeve.

Figure 7 is a longitudonal sectional view through the work rotating mechanism.

Figure 8 is an end view of the work chuck with parts broken away.

Figure 9 is a sectional view on the line 9—9 of Figure 7, and

Figure 10 is a section as on the line 10—10 of Figure 2.

Referring to the drawings, the numeral 15 denotes the bed of a grinding machine of the centerless type having a cutting member illustrated as a grinding wheel 16 suitably driven downwardly at its inner side as indicated by the arrow in Figure 10, while opposed to said cutting member is a work positioning member or regulating wheel 17 driven upwardly at its innerside as indicated by the arrow in Figure 10. Suitable mechanism of conventional form including the slide 18 serves to vary the separation between these wheels according to the diameter of the work being operated upon. Secured on the slide 18 is a work guiding bracket member 19 having a forwardly extending position 20 and a rear portion 21. The central portion of the bracket extends into the throat between the grinding and regulating wheels and has adjustably mounted thereon the work support or rest shown in detail in Figure 4. This work support comprises a body portion 22 having the elongated slots 23 for the clamp bolts 24 which serve to secure the rest in vertical adjustment to vary the position of the work in the grinding throat. Said rest has a concaved upper face as at 25 adapted to receive and guide the cylindrical portion 26 of the work piece and a beveled or downwardly inclined portion 27 corresponding substantially to the taper 28 on the grinding wheel to form a progressively rising support for the work as its diameter is decreased from that of the diagonal of the rectangular piece to the final diameter of the reduced cylindrical rod.

To guide the work in the grinding throat and eliminate liability of whipping, chatter or the like, the bracket portion 21 is preferably formed with an overhanging arm 29 on which is mounted a second work guiding member designated as an entirety by the numeral 30. This member is similar in structure to the work rest just described with the exception that it is oppositely arranged. Both members 22 and 30 have their faces on the side toward the regulating wheel beveled as at 31 to permit of inward adjustment of the regulating wheel. The necessity for this will be best understood by reference to Figure 10 from which it will be seen that to secure proper rigidity for the bracket, its overhanging arm and the several associated parts it is desirable to make these of considerable weight and to then taper them inwardly to minimum thickness within the throat so that contraction of the throat to engage work of small diameter is possible.

The mechanism for guiding and introducing the work into the grinding throat will best be undertsood by reference to Figure 7, from which it will be seen that the portion 20 of supporting bracket 19 is provided with the aperture or bore 32 for the guiding sleeve 33 supporting in the plurality of the anti-friction bearings 34 to facilitate free spinning thereof. This member bears on its inner end a work chuck comprising the hub 35 splined against rotation as at 36 and bearing the head 37 having the non-radial offset transverse grooves 39. Sliding in these grooves are the jaw blocks 40 formed with pins 41 engaged in eccentric slots 42 of the adjusting collar 43. Portions 35 and 43 are knurled to facilitate relative rotation therebetween whereby the in and out position of the jaws is varied as will be apparent by reference to Figures 8 and 9. The arrangement of grooves 39 is such that a centered rectangular guide space of constant shape but variable as to size is provided which at all adjustments has its center axially of sleeve 33 thus determining the axis of the work piece. A friction locking device such as the set-screw 44 serves to retain the parts in relative adjusted position. In use, the jaws are set to initially engage the work piece 45 in its square form and allow it to slide freely therebetween while properly laterally engaging the work to insure its rotation therewith. The rear face of the jaws are beveled as at 46 to facilitate introduction of the work.

The form of machine having opposed grinding and regulating wheels is commonly known as a centerless grinder and it is customary in such machines to drive the grinding wheel downwardly toward the work support at a high or cutting speed while the regulating wheel moves upwardly holding the work against the grinding wheel and controlling the rotation thereof. In addition the regulating wheel is set with its axis at a slight angle to that of the grinding wheel and the work support with the result that it exerts a longitudinal thrust or feed component against the work causing the same to move through the throat between the wheels.

While this is entirely satisfactory for grinding of ordinary cylindrical work some additional mechanism is necessary in reducing square or irregular shaped work pieces to cylindrical form in that an initial rotation should be applied to the work for removal of the square corners thereof. This is accomplished in the form illustrated by making use of motor 47 connected as by silent chain 48 with gear 49 supported by anti-friction bearing 50 on sleeve 33. A face clutch as at 51 serves to frictionally connect gear 49 with clutch sleeve 52 which is slidably keyed on sleeve 33 and urged into clutching position by spring 53. The shifter yoke 54 is of bell-crank form, being intermediately pivoted to bracket portion 20 and has its free end provided with the roller 55 engaged by cam 56 on the shifter arm 57 slidably supported by the bracket. As illustrated in Figure 7 the parts are in operative engagement so that the motor through the clutch drives sleeve 33. To disconnect the drive, shifting of arm 57 to the left causing cam 56 to depress roller 55 thus rocking the shifter arm and declutching gear 49.

In operation, the work piece is inserted between jaws 40 and clutch 51 engaged to rotate same. The work is then suitably inwardly pressed as by manual engagement thereof to bring the end into the contracting throat between the bevel portion 28 of grinding wheel and the similarly beveled portion 58 of the regulating wheel. The action of the grinding wheel will then chamfer the work as is indicated for example at 59, taking off the corners and reducing the rectangular strips to cylindrical form. The speed of the motor 47 may be so regulated as to be identical with that of the regulating wheel 17 if desired, or if preferred the speed may be somewhat different, as for example, slower than that of the regulating wheel. The tension of spring 53 is sufficiently light that when the work is well in position between the two wheels the grip and traction of the regulating wheel will be greater than that of the clutch 51 so that the work will take up the speed and feed imparted by the regulating wheel producing slippage of the clutch or the clutch may be thrown out of operation once the work is well between the wheels. In this manner an automatic grinding action is produced.

To facilitate high speed grinding and reduce the heat effects use is made of a water compound or cutting lubricant supplied through the pipe 60 and nozzle 61. There is a natural tendency for a certain amount of this fluid to follow back along the work and for this reason special packing joints as indicated are provided to protect the bearings of the sleeve 33. Also to prevent the fluid flowing out on the floor about the machine from the far end of the guide tube 33, this end is loosely enclosed by the housing 62 supported by standard 63 and provided with a drain 64 from which the pipe 65 returns the cutting compound which has forced its way out through tube 33 to the customary tank at the base of the machine.

From the foregoing description the manner of carrying out of the present improved process as well as the details of the specific machine which illustrates one method of carrying out of same should be readily understood and it will be seen that by the use of the improved process a work piece of angular form may be readily brought with a positive rotation into engagement with a cutting member of tapered formation which will gradually reduce the member to cylindrical form and that the work is then moved an appreciable distance in contact with a cutting member disposed parallel with the axis thereof which will remove any irregularities produced from the reduction from square to cylindrical cross-section form and producing a smoothly finished article of extreme accuracy.

It will further be noted that the improved machine for carrying out of this process includes means for imparting an initial rotation to the work piece prior to its introduction into the grinding throat, and that the said rotating mechanism is of shape and form to properly and accurately position the work for satisfactorily engagement by the members together forming the work throat and that subsequent to such engagement the rotation may be left entirely to the control of the regulating wheel for continuation and completion of the desired operation.

I claim:

1. A machine of the character described including opposed grinding and regulating wheels having their opposed portions parallel and forming a grinding throat, and a work support extending transversely in said throat, said parts having correspondingly tapered portions at the entrant side of the machine to support and engage a workpiece and reduce it to proper size to enter said throat, the regulating wheel serving to frictionally engage and rotate the work, and additional means exterior to the throat for imparting a positive rotation thereto.

2. A machine of the character described including a bed, opposed grinding and regulating wheels mounted thereon and forming a work-receiving throat, a work support disposed within the throat, said parts all having correspondingly tapered entrant portions to facilitate reception and reduction of square work pieces, a work guiding chuck adjacent said parts, said chuck having means for engaging work pieces of non-circular cross-section, and means for rotating said chuck to positively apply initial rotation to said work pieces prior to their engagement in the grinding throat of the machine.

3. A centerless grinder including opposed grinding and regulating wheels and an intermediate work rest, and means exterior to the grinding throat between the wheels for initially imparting rotative action to the work, including a rotatable sleeve and a chuck member carried by the sleeve having angularly related jaws for nonrotatably engaging a work piece without frictionally retarding the longitudinal movement thereof.

4. A centerless grinder including opposed grinding and regulating wheels and an intermediate work rest, means exterior to the grinding throat between the wheels for initially imparting rotative action to the work, including a rotatable sleeve and a chuck member carried by the sleeve having angularly related jaws for nonrotatably engaging a work piece without frictionally retarding the longitudinal movement thereof, and means for adjusting the relative position of the jaws to vary the effective size of aperture therebetween.

5. A centerless grinder for reducing articles of irregular contour to circular form in cross-section, including opposed grinding and regulating wheels and an intermediate work rest, said wheels being shaped to form a flaring entrant throat and means exterior to the throat for imparting rotation to the work, including a rotatable chuck having guiding jaws for non-frictionally engaging the work, driving means for the chuck, means for frictionally connecting the chuck with the driving means and a release device for disengaging the friction connection.

6. A centerless grinder for shaping a noncylindrical rod into cylindrical form, including opposed grinding and regulating wheels having their entrant faces bevelled to provide a flaring entrant throat, and a bracket projecting between the wheels and bearing a work rest blade and a spaced work guiding blade, said blades having their portions at the entrant side tapered to provide a flaring work receiving throat, substantially as and for the purpose described.

7. A centerless grinder for shaping a noncylindrical rod into cylindrical form, including opposed grinding and regulating wheels having their entrant faces bevelled to provide a flaring entrant throat, a bracket projecting between the wheels and bearing a work rest blade and a spaced work guiding blade, said blades having their portions at the entrant side tapered to provide a flaring work receiving throat, substantially as and for the purpose described, and a driven work guide exterior to the throat having a guide portion corresponding in configuration to the initial cross-sectional shape of the work piece, but of slightly larger size than the work piece, whereby said member will non-rotatably engage the work piece with a minimum of retardant friction.

8. In a device of the class described the combination of a grinding wheel, an opposed regulating wheel, a work rest blade, and a work guiding blade, each having a tapered entrant portion for receiving, guiding and reducing work pieces, and each of the wheels, work support and work guiding blades having a plane portion for grinding, supporting and guiding the work previously formed.

9. In a device of the class described the combination of a grinding wheel having a tapered portion for forming work pieces and a plane portion for grinding the formed work, an opposed regulating wheel having complementary tapered and plane portions for frictionally engaging the work and holding it against the grinding wheel, a work rest blade and a work guiding blade each having a tapered portion and a plane portion complementary to the tapered and plane portions on the grinding and regulating wheels, the work rest and guide blades being provided with slots whereby they may be adjusted toward and away from one another and means for locking the work rest and guide blades in adjusted positions.

10. In a device of the class described the combination of opposed grinding and regulating wheels having a grinding throat between them, the regulating wheel frictionally engaging the work and feeding it through the grinding throat, and means exterior to the throat in axial alinement with the throat loosely engaging the work and initially rotating it, this means being adapted to permit the work to slip therethrough when the work is being fed by the regulating wheel.

11. In a device of the class described the combination of opposed grinding and regulating wheels having a grinding throat between them, the regulating wheel frictionally engaging the work and feeding it through the grinding throat, means exterior to the throat in axial alinement with the throat loosely engaging the work and initially rotating it, this means being adapted to permit the work to slip therethrough when it is being fed through the grinding throat by the regulating wheel, and means for connecting and disconnecting the last mentioned means with a power source.

GEORGE W. BINNS.